United States Patent [19]
Specktor et al.

[11] Patent Number: 4,618,162
[45] Date of Patent: Oct. 21, 1986

[54] DEVICE AND METHOD FOR ADJUSTING CAMBER IN A STRUT-TYPE VEHICLE SUSPENSION

[75] Inventors: John Specktor, Golden Valley; Gerald A. Specktor, St. Paul, both of Minn.

[73] Assignee: Shim-A-Line, Inc., Minneapolis, Minn.

[21] Appl. No.: 770,744

[22] Filed: Aug. 29, 1985

[51] Int. Cl.[4] .............................................. B62D 17/00
[52] U.S. Cl. ..................................... 280/661; 72/704; 280/668
[58] Field of Search .................... 72/70; 280/661, 668

[56] References Cited

U.S. PATENT DOCUMENTS

| 2,065,071 | 12/1936 | Harris | 280/124 |
| 2,882,066 | 4/1959 | Petrak | 280/96.2 |
| 3,273,909 | 9/1966 | Miller et al. | 280/96.2 |
| 3,285,622 | 11/1966 | Castoe | 280/96.2 |
| 3,917,308 | 11/1975 | Schulz | 280/124 B |
| 4,030,737 | 6/1977 | Bridges | 280/661 |
| 4,194,760 | 3/1980 | Shiomi et al. | 280/661 |
| 4,313,617 | 2/1982 | Muramatsu et al. | 280/661 |
| 4,418,938 | 12/1983 | Sullivan et al. | 280/661 |
| 4,420,170 | 12/1983 | Wysocki | 280/661 |
| 4,462,241 | 7/1984 | Whisenant | 280/661 |
| 4,493,493 | 1/1985 | Satchell et al. | 280/661 |

OTHER PUBLICATIONS

"Service Slants–Service and Repair Tips from the Domestic Manufacturers," *Motor Magazine*, p. 86, Feb. 1984.

Primary Examiner—Richard A. Bertsch
Attorney, Agent, or Firm—Kinney & Lange

[57] ABSTRACT

Camber is adjusted in a strut-type suspension by replacing one of the two factory-installed bolts that holds the wheel onto the strut with a replacement bolt having a shaft portion that is narrower in diameter than the hole which retains the original bolt. A wedge is then inserted between the strut and the wheel mounting such that camber is adjusted with the wheel mounting pivoting about the remaining second factory bolt holding the wheel mounting to the strut. Preferably, the wedge has a threaded rod extending from the narrower portion of the wedge through a washer that is retained by a bracket holding the wheel mounting to the strut. A nut is threaded onto the bolt and works against the washer to pull the wedge between the wheel mounting and the strut to adjust camber and to retain the wedge between the wheel mounting and the strut.

12 Claims, 5 Drawing Figures

U.S. Patent  Oct. 21, 1986  4,618,162
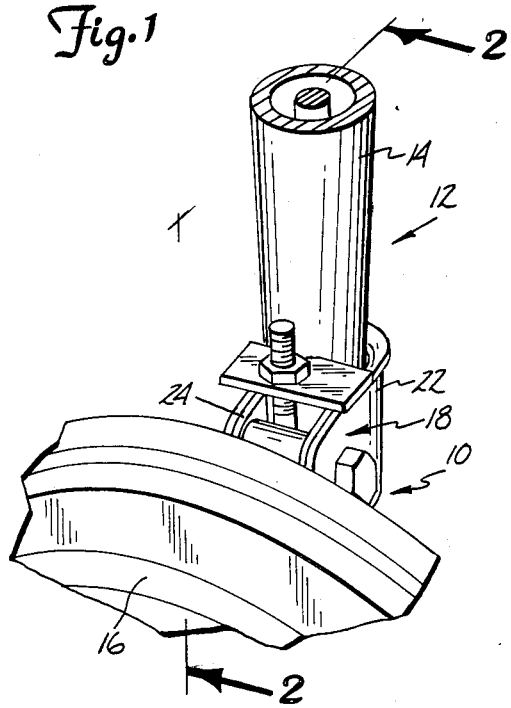
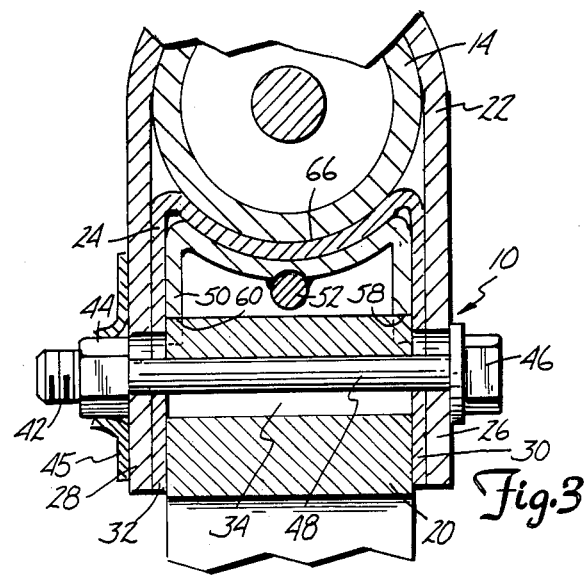
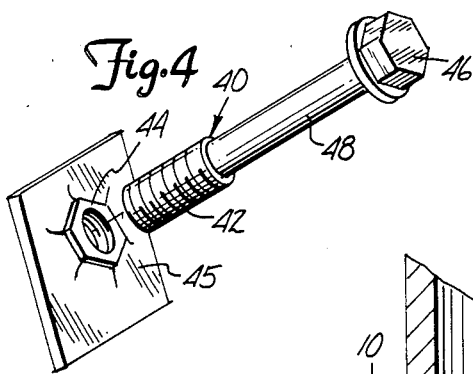
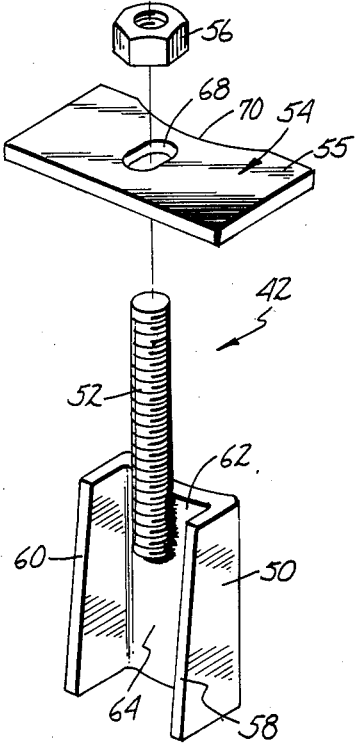
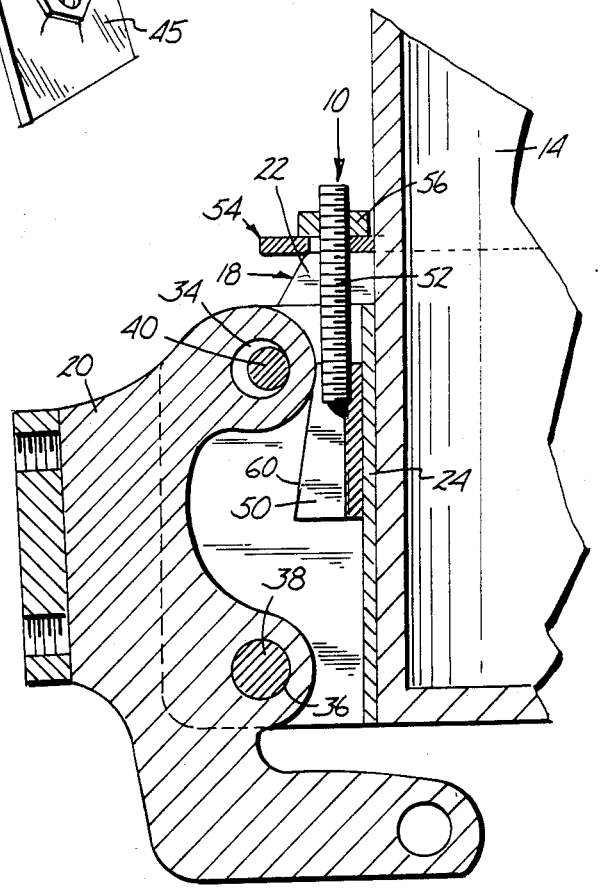

DEVICE AND METHOD FOR ADJUSTING CAMBER IN A STRUT-TYPE VEHICLE SUSPENSION

BACKGROUND OF THE INVENTION

1. Field of the Invention

The present invention relates to devices that adjust wheel camber on vehicles, and in particular, it relates to devices which adjust camber on strut-type vehicle wheel suspensions.

2. Description of the Prior Art

There has been a general trend in the manufacture of automobiles to make automobiles lighter. To accomplish this end, conventional axles and suspensions are being eliminated and strut-type suspension, such as the McPherson-type suspension, are being used more and more.

In a strut-type suspension, there is no camber adjusting mechanism. The camber angle is preset in the factory. If the camber angle is wrong due to an error in assembling the suspension system, there is an adverse effect on tire wear of the vehicle. Likewise, if a car having a strut-type suspension is involved in an accident, or even hits a curb, the camber angle will change from the correct angle and cause a problem in the ride of the automobile and/or the wear of the tires.

There have been several attempts to provide a mechanism to correct the camber angle in strut-type suspensions.

One example of an attempt to adjust camber is explained on page 86 of *Motor Magazine* in the February 1984 issue. The procedure for adjusting camber includes removing the wheel and tire, the brake clip and bracket and the two bolts holding the spindle to the strut, nuts and retainer plate. The bolts and the nuts are discarded. A narrower bolt than the original bolt is then placed in the lower hole. A wedge having teeth along one surface is positioned between the spindle and the strut with the teeth facing the spindle. A second even narrower bolt is placed in the upper hole. The brake drum is then removed and the wedge is lightly tapped to force the wedge further between the spindle and the strut. The camber is then checked against the factory specification and both bolts are torqued. The parts that had been previously removed are then assembled. This procedure is quite labor intensive.

Another mechanism to adjust camber in a strut-type suspension is described in the Muramatsu et al. U.S. Pat. No. 4,313,617. The Muramatsu et al. patent discloses the use of a rotatable eccentric along the upper bolt that holds the wheel spindle to the strut bracket. The eccentric has a tab or lever portion which permits the eccentric to be rotated about the bolt forcing the upper end of the spindle away from the strut, adjusting the camber. This device, however, has the disadvantage that the eccentric is not positively held in place and may move causing a change in the desired camber angle.

Still another device for adjusting the camber angle in a strut-type suspension is described in the Sullivan et al. U.S. Pat. No. 4,418,938. This method provides for the removal of the original upper bolt holding the wheel spindle to the strut bracket and inserting in its stead a bolt having a narrower diameter. A threaded hole is provided in the wheel spindle which communicates at right angles to the hole in which the narrower bolt has been inserted. A set screw is then threadably inserted into the threaded hole and acts against the bolt pivoting the spindle and the wheel about the lower bolt, adjusting the camber. The Sullivan et al. method has the disadvantage of having to modify the wheel spindle to receive the set screw.

Still another method of adjusting camber in a strut-type vehicle suspension is described in the Wysocki U.S. Pat,. No. 4,420,170. This method includes slotting the lower bolt hole which holds the wheel spindle onto the strut bracket and inserting a U-shaped member having two arms which surround the strut and engage the lower bolt. The U-shaped member further includes a set screw arrangement which acts against the strut member such that the arms of the U-shaped member engage the bolt and adjust the camber of the wheel. The Wysocki method has the disadvantage of having to modify the lower hole that retains the lower bolt.

Other patents describe still other arrangements for adjusting camber in strut-type vehicle suspensions or other types of suspensions. These patents include:

| Inventor | Patent No. |
|---|---|
| Shiomi et al | 4,194,760 |
| Bridges | 4,030,737 |
| Schulz | 3,917,308 |
| Castoe | 3,285,622 |
| Muller et al | 3,273,909 |
| Petrak | 2,882,066 |
| Harris | 2,065,071 |

However, none of the immediately above mentioned patents describe a simple method or device that does not require modification of the strut, strut bracket, or wheel spindle and does not require disconnection of other parts to adjust the camber of a wheel in a strut-type suspension system.

SUMMARY OF THE INVENTION

The present invention includes a device for adjusting camber in a strut-type suspension, such as a McPherson-type suspension. Such a strut-type suspension includes a wheel spindle that is mounted to the strut by a bracket. The wheel spindle is attached to the bracket by a first upper bolt and a second lower bolt, both bolts extending through bolt holes in the wheel spindle and the bracket.

The present invention includes a wedge-shaped member, a replacement bolt having a shaft portion with a reduced diameter and a mechanism for retaining and moving the wedge member between the wheel spindle and the strut. The wedge-shaped member has an angularly disposed edge surface that extends from a narrower end portion to a wider end portion. The replacement bolt is substituted for the first upper bolt. The wedge shaped member is inserted between the wheel spindle and the strut member with the narrower end portion facing upwardly.

Preferably the mechanism for retaining and moving the wedge member includes a threaded rod attached to the wedge shaped member which extends outwardly from the narrower end portion. A retaining washer is positioned to rest on top of the bracket and has a slot through which the threaded rod extends and a nut is then threadably fastened onto the rod. A nut is threaded onto the rod to move the wedge member between the spindle and the strut member to adjust camber. When the desired camber adjustment is reached, the replacement bolt and the second bolt are tightened.

BRIEF DESCRIPTION OF THE DRAWINGS

FIG. 1 is a perspective view of the device of the present invention in use in a strut-type suspension.

FIG. 2 is a cross-sectional view taken along the line 2—2 in FIG. 1 with portions shown whole for clarity.

FIG. 3 is a sectional view showing the device of the present invention in use in a strut-type suspension.

FIG. 4 is a perspective view of a bolt of the present invention having a reduced diameter portion.

FIG. 5 is a perspective view of a wedge, washer and nut assembly of the present invention.

DETAILED DESCRIPTION OF THE PREFERRED EMBODIMENTS

Referring to FIG. 1, the present invention generally indicated at 10 is illustrated in use with a strut-type suspension system 12. The strut-type suspension system includes a substantially vertical strut member 14. A wheel 16 is connected to the strut member 14 by a connecting bracket assembly 18.

As better illustrated in FIG. 2, the wheel 16 is connected to the strut member 14 by a wheel spindle section 20 with the bracket assembly 18. The bracket assembly 18 includes an outer support bracket 22 and an inner support bracket 24. As best seen in FIG. 3, the outer support bracket 22 extends around the strut member 14 and has side flange sections 26 and 28 that extend on opposite sides of the wheel spindle section 20. The inner support bracket 24 engages an inside outer surface of the strut member 14 and has side flange portions 30 and 32 which extend from the strut member 14 in the same direction as side flange portions 26 and 28. The side flange portions 26 and 30 are adjacent such that they form a single flange assembly. Similarly side flange portions 28 and 32 are adjacent such that they form a single flange assembly.

The spindle section 20 and the flange sections 26 and 30 and the flange sections 28 and 32 each have upper and lower apertures forming an upper bolt hole 34 and a lower bolt hole 36, respectively, as illustrated in FIG. 2. When the strut suspension is assembled in the factory, the upper bolt hole 34 has a factory installed bolt (not shown) of a diameter that is substantially the same as the diameter of the bolt hole 34. As illustrated in FIG. 2, this factory bolt has been removed. The lower bolt hole 36 also contains an original factory bolt 38.

The present invention provides for removal of the factory bolt (not shown) from the upper bolt hole and insertion of a replacement bolt 40, illustrated in FIG. 4, in the bolt hole 34 and placement of a device 42 having a wedge shaped member 50 between the spindle section 20 and the strut member 14. The present invention permits the adjustment of camber without any modification to the spindle section 20 or to the strut-type suspension using the same factory installed parts except for the upper factory bolt (not shown).

The replacement bolt 40 has a threaded end portion 42 which has the same diameter as the original factory bolt, so that the original nut 44 which is contained in a harness 45 can be threaded onto the bolt 40. The replacement bolt 40 also has a cap head 46 of similar or like size as the factory bolt. However, the bolt 40 has a reduced diameter portion 48 that extends between the threads 42 and the cap head 46 and is sufficiently long in length such that it is at least as long as the bolt hole 34.

The device 42, as illustrated in FIG. 5, includes the wedge member 50 and a threaded rod 52 fixedly attached to the wedge member 50, such as by welding to an inner surface 64, and a retaining washer 54 and a nut 56. The wedge member 50, as preferably shown, is made of stamped out metal having angularly disposed surfaces 58 and 60. The threaded rod 52 is disposed longitudinally with respect to a longitudinal axis of the wedge 50 and extends outwardly from a narrower end portion 62 of the wedge member. As illustrated in FIG. 3, the wedge has an outer curved surface 66 that substantially conforms to the curved surface of the inner support bracket 24. In another preferred embodiment (not shown) the wedge is made of solid metal with the rod embedded therein and has a continuous angularly disposed surface instead of surfaces 58 and 60.

The retaining washer 54 includes a slotted aperture 68 through which the threaded rod 52 extends. The nut 56 is threaded onto the rod 52 on a top side 55 of the washer 54. The retaining washer also has curved surface 70 which conforms to the curved surface of the strut member 14.

To adjust the camber of the wheel 16 using the present invention, the wheel is jacked up in a conventional manner. The lower belt 38 and the nut (not shown) that retains the lower bolt are loosened but left in bolt hole 36. The upper factory bolt (not shown) is removed and discarded and the nut 44 is saved. The top of the wheel is pulled outwardly away from the strut member as far as it will go, pivoting on the bolt 38. The device 42 with retaining washer 54 and nut 56, assembled as a unit, is positioned between the spindle section 20 containing the bolt hole 34 and the inner bracket 24 and the strut member 14. The retaining washer rests on the bracket 22 with the curved surface 70 in engagement with the strut member. The curved surface 66 of the wedge member contacts the inner bracket 24 when the device 42 is in place, the top of the wheel is then pushed in as far as possible and the replacement bolt 40 is positioned within the bolt hole 34 and the bolt threaded into the nut 44. At this point, the nut and bolt are not tightened. As best seen in FIG. 3, the reduced portion 48 lies within the bolt hole 34 permitting pivotal movement of the spindle section 20 about the lower bolt 38.

The device 42 with the washer 54 and the nut 56 preferably in an assembled condition, as illustrated in FIG. 2, is inserted from the top between the spindle section 20 proximate the hole 34 and the inner bracket 24 and the strut member 14. The washer 54 rests on top of the side flanges 28 and 26 of the outer bracket 22 holding the wedge member 50 in position. The curved portion of the washer 70 abuts the strut member 14 and the curved surface 66 of the wedge member 50 abuts against the inner bracket 24.

After the device 42 is in position, the wheel is pushed toward the strut member such that the wheel spindle abuts against the angularly disposed surfaces 58 and 60. The lower bolt 38 and nut are tightened slightly so that the wheel spindle stays in position but are not tightened such that the wheel spindle cannot be pivoted about the bolt 38. The camber of the wheel is then adjusted by turning the nut 56 pulling up the wedge member until the desired camber is reached. Both bolts 38 and 40 are then tightened while holding the wheel against the wedge member according to specification. The wheel is lowered and the jack is removed and camber readings are taken to double check the camber.

If readjustments are necessary, they may be made without removing the wedge member 50. The wheel is simply jacked up, bolts 38 and 40 are loosened, the wedge member is positioned as needed. To increase camber, the nut 56 is turned to pull the wedge member up. To decrease camber, the nut 56 is turned in an opposite direction and the top of the rod 52 is tapped lightly to move the wedge member downwardly. The bolts 38 and 40 are tightened according to the procedure described previously above.

The present invention is especially useful in adjusting camber on cars manufactured by Ford Motor Company under the trademarks ESCORT, LYNX, EPX, TEMPO and TOPAZ. However, the present invention is not limited to the above-mentioned automobiles, but is useful on other cars having similar strut-type suspensions.

In summary, the present invention permits adjustment of the camber on a strut-type suspension in a simple and easy manner without any modifications to the wheel spindle, bracket or suspension with a mininum amount of labor. The wheel spindle is held positively in place at the desired camber and the camber can be subsequently readjusted.

Although the present invention has been described with reference to preferred embodiments, workers skilled in the art will recognize that changes may be made in form and detail without departing from the spirit and scope of the invention.

What is claimed is:

1. A device for adjusting camber of a wheel attached to a vehicle by a strut-type suspension having a strut member, the wheel supported by a wheel support member having first and second spaced-apart apertures, bracket means fixedly attaching the wheel support member to the strut member, the bracket means having two side portions extending on opposite sides of the wheel support member and each side portion having first and second apertures alignable with the first and second apertures of the wheel support member, respectively, and a first bolt extending through the first apertures of the wheel support member and the side portions of the bracket means, the device comprising:
    a wedge member having an angularly disposed edge surface extending between a first end portion and a second end portion narrower than the first end portion, the wedge member being positionable between the support member and the strut member;
    a second bolt having a shaft portion of a substantially smaller diameter than the second apertures of the wheel support member and the side portions of the bracket means insertable through the second apertures; and
    retaining and positioning means for retaining the wedge member in a fixed position between the support member and the strut member and for positioning the wedge member between the support member and the strut member to adjust camber.

2. The device of claim 1 wherein the retaining and positioning means includes a rod extending from the second end portion of the wedge member and means for engaging the rod to retain the wedge member in a fixed position and for acting on the rod to position the wedge member in either direction along a line substantially parallel to an axis of the strut member.

3. The device of claim 2 wherein the means for retaining and the means for acting includes a plate having a third aperture, the plate being positionable on the bracket means and the rod insertable through the aperture and wherein the rod has a threaded portion and a nut for engaging the threaded portion of the rod such that when the nut is threaded onto the rod, the nut and the plate act to move the wedge member along either direction of the line substantially parallel to the axis of the strut member.

4. The device of claim 1 wherein the substantially smaller diameter of the second bolt is sufficiently long to extend between outside surfaces of the two side portions of the bracket means.

5. The device of claim 4 wherein the second bolt includes a threaded end portion having a diameter substantially similar to a factory installed bolt in the second apertures.

6. A kit for adjusting camber of a wheel attached to a vehicle by a strut-type suspension having a strut member, the wheel supported by a wheel support member having upper and lower spaced-apart apertures, bracket means attaching the wheel support member to the strut member, the bracket means having two side portions extending on opposite sides of the wheel support member and each side portion having upper and lower apertures alignable with the upper and lower apertures of the wheel support member, respectively, and factory-installed bolts extending through the upper and lower apertures of the wheel support member and the side portions of the bracket means, the kit comprising:
    a wedge having a first end portion and a second end portion narrower than the first end portion, the wedge member being positionable between the support member and the strut member;
    a replacement bolt having a shaft portion of a substantially smaller diameter than the upper apertures of the wheel support member and the side portions of the bracket means for replacement of the factory-installed bolt in the upper apertures; and
    means for moving the wedge member along a line substantially parallel to an axis of the strut member between the support member and the strut member to adjust camber.

7. The device of claim 6 wherein the replacement bolt includes a threaded end portion having a diameter substantially similar to the factory-installed bolt.

8. The device of claim 6 wherein the means for moving includes a rod extending from the second end portion of the wedge member and means for retaining and for moving the rod to retain the wedge member in a fixed position and to move the wedge member in either direction along a line substantially parallel to an axis of the strut member.

9. The device of claim 8 wherein the means for retaining and for moving includes a plate sufficient in size to rest on the bracket means and including an aperture through which the rod extends and wherein the rod is threaded and a nut for threadably engaging the rod such that the nut, the rod and the plate act to move the wedge member along either direction of the line parallel to the axes of the strut member.

10. The device of claim 6 wherein the substantially smaller diameter of the replacement bolt is of a sufficient length to extend between outside surfaces of the two side portions of the bracket means.

11. A method for adjusting camber of a wheel attached to a vehicle by a strut-type suspension having a strut member, the wheel supported by a wheel support member having first and second spaced-apart apertures, bracket means fixedly attaching the wheel support member to the strut member, the bracket means having two side portions extending on opposite sides of the wheel support member and each side portion having first and second apertures alignable with the first and second apertures of the wheel support member, respectively, and first and second bolts extending through the first and second apertures of the wheel support member and the side portions of the bracket means, the method comprising:
- removing the first bolt;
- loosening the second bolt;
- placing a wedge member between the wheel support member and the strut member;
- positioning a plate having an aperture on top of the bracket means;
- inserting a replacement bolt having a shaft portion substantially smaller in diameter than the first bolt into the first aperture of the wheel support member and the side portions of the bracket means; and
- acting on a rod extending from the wedge member through the aperture of the plate such that the wedge member is moved between the wheel support member and the strut member to adjust camber.

12. The method of claim 11 wherein the rod is acted on by positioning a plate on the bracket means with the rod extending through an aperture of the plate and threading a nut on the rod such that the nut and the plate act to move the rod in either direction along an axis substantially parallel to the strut member.

* * * * *